(12) United States Patent
Greig (10) Patent No.: US 8,300,973 B2
(45) Date of Patent: Oct. 30, 2012

(54) PRE-FILTER FOR OBJECT DETECTION

(75) Inventor: Darryl Greig, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1358 days.

(21) Appl. No.: 11/953,221

(22) Filed: Dec. 10, 2007

(65) Prior Publication Data

US 2008/0181455 A1 Jul. 31, 2008

(30) Foreign Application Priority Data

Jan. 30, 2007 (GB) .................................. 0701717.1

(51) Int. Cl.
*G06K 9/40* (2006.01)
(52) U.S. Cl. ....................................... 382/260; 382/265
(58) Field of Classification Search .................. 382/103, 382/260, 118, 117, 106, 190, 228, 297, 296, 382/289, 265, 274; 250/370.09; 378/17; 715/863; 340/5.2, 5.83; 348/208.13; 358/462, 358/448
See application file for complete search history.

(56) References Cited

U.S. PATENT DOCUMENTS

| | | | | |
|---|---|---|---|---|
| 5,892,592 A * | 4/1999 | Adachi et al. | ................. | 358/462 |
| 6,463,163 B1 | 10/2002 | Kresch | | |
| 7,181,086 B2 * | 2/2007 | Gindele et al. | ................. | 382/265 |
| 7,565,030 B2 * | 7/2009 | Steinberg et al. | ............. | 382/296 |
| 7,835,551 B2 * | 11/2010 | Masaki et al. | ................. | 382/118 |
| 7,844,135 B2 * | 11/2010 | Steinberg et al. | ............. | 382/296 |
| 7,881,494 B2 * | 2/2011 | Kitamura | ...................... | 382/103 |

FOREIGN PATENT DOCUMENTS

| | | |
|---|---|---|
| GB | 2395778 A | 6/2004 |
| JP | 2003223642 A | 1/2002 |

\* cited by examiner

*Primary Examiner* — Anh Hong Do (57) ABSTRACT

A method of pre-processing an image to identify processes for subsequent processing of the image, comprising the steps of:
a) investigating portions of the image using a spatial filter;
b) calculating for a first plurality of regions within a portion of the image under investigation respective metrics as a function of intensity within those regions;
c) selecting combinations of regions within the portion of the image under investigation and processing them to obtain a second plurality of filter values, where the second plurality is greater than the first plurality; and
d) comparing the filter values with process thresholds for subsequent processes so as to identify subsequent processes that can be skipped.

24 Claims, 7 Drawing Sheets

|     | $P_1$ | $P_2$ | $P_3$ | $P_4$ |
| --- | --- | --- | --- | --- |
| $F_1$ | 0.90 | 0 | 0.13 | 0.09 |
| $F_2$ | 0.02 | 0.88 | 0.41 | 0.03 |
| $F_3$ | 0.11 | 0.21 | 0.91 | 0.24 |
| $F_4$ | 0.85 | 0.24 | 0.41 | 0.83 |

|  | $P_1$ | $P_2$ | $P_3$ | $P_4$ |
|---|---|---|---|---|
| $F_1$ | $\theta_{11}T_{11}$ | $\theta_{12}T_{12}$ | $\theta_{13}T_{13}$ | $\theta_{14}T_{14}$ |
| $F_2$ | $\theta_{21}T_{21}$ | $\theta_{22}T_{22}$ | $\theta_{23}T_{23}$ | $\theta_{24}T_{24}$ |
| $F_3$ | $\theta_{31}T_{31}$ | $\theta_{32}T_{32}$ | $\theta_{33}T_{33}$ | $\theta_{34}T_{34}$ |
| $F_4$ | $\theta_{41}T_{41}$ | $\theta_{42}T_{42}$ | $\theta_{43}T_{43}$ | $\theta_{44}T_{44}$ |

Fig. 9

PRE-FILTER FOR OBJECT DETECTION

The present invention relates to a method of and apparatus for implementing a pre-filter for object detection.

The present application claims priority from GB 0701717.1 filed on 30 Jan. 2007, the teachings of which are hereby incorporated by reference.

This patent also makes reference to use of a Viola-Jones face detection algorithm. The teachings of the paper "Robust Real Time Objection Detection" by Paul Viola and Michael J Jones is available at http://www.hpl.hp.com/techreports/compaq-DEC/CRL-2001-1.pdf and is incorporated herein by reference.

SUMMARY OF THE INVENTION

According to a first aspect of the present invention there is provided a method of pre-processing an image to identify processes for subsequent processing of the image, comprising the steps of:
a) investigating portions of the image using a spatial filter;
b) calculating for a first plurality of regions within a portion of the image under investigation respective metrics as a function of intensity within those regions;
c) selecting combinations of regions within the portion of the image under investigation and processing them to obtain a second plurality of filter values, where the second plurality is greater than the first plurality; and
d) comparing the filter values with process thresholds for subsequent processes so as to identify subsequent processes that can be skipped.

Advantageously the spatial filter comprises at least three portions therein.

According to a second aspect of the present invention there is provided an image processor arranged to perform the method of the first aspect of the invention.

According to a third aspect of the present invention there is provided a computer program adapted to cause a computer to perform the method of the first aspect of the invention.

BRIEF DESCRIPTION OF THE DRAWINGS

The present invention will further be described, by way of example only, in which.

DESCRIPTION OF PREFERRED EMBODIMENTS

It is known that image recognition systems already exist for identifying specific types of image in a specific orientation. An example of a known image recognition system is the Viola-Jones image recognition algorithm used for identifying faces where the face is staring directly at the camera, and is upright.

Although the Viola-Jones algorithm has limitations, such that the face must be "correctly" orientated with respect to a direction of look that the algorithm has been optimised for, the algorithm is fast and robust. This success of algorithm to a large extent creates problems when trying to improve the algorithm to detect faces which are not correctly orientated. For example, because a common implementation of the Viola-Jones algorithm looks for faces that are upright and directly facing the camera such an implementation may fail to locate a person's face if the person's head is inclined to one side, or does not face the direction of view of the camera, perhaps because the person is looking in a different direction. Attempts to include testing for these conditions generally slow the algorithm down immensely.

The inventor realised that rather than modify the Viola-Jones face detection algorithm itself, it would be beneficial to train multiple versions of that algorithm to detect faces having different orientations. This in itself does not provide a wholly acceptable solution to face detection capability in an image because initial work suggested that somewhere between 36 and 60 individual face orientations would need to be processed in order to adequately cover images where the faces were not upright, and/or where they were not looking directly at the camera. This in turn would lead to a proportional decrease in processing speed.

In order to provide improved detection capability without causing a such a proportionate decrease in throughput, the inventor realised that some form of pre-filtering and algorithm selection would be required. Thus, the pre-selection enables particular versions of the Viola-Jones (or other algorithm) that detect a face at a specific orientation to be skipped (i.e. omitted) from the search process, thereby reducing the computational burden. However the pre-filtering and algorithm selection process should itself be computationally fast to execute if it is not to impose an unacceptable computational burden within a data processor.

Face detection algorithms can be run in many computing environments. Some of these environments have quite limited resources, for example limited processing power is available within portable cameras, mobile telephones having cameras, PDAs, and printers. More processing power may be available in security systems based on face identity, as well as general purpose computers.

One of the advantages of the Viola-Jones face detection algorithm is that it uses relatively simple processing techniques to scan an image. The inventor has realised that any pre-filter should try to use similar image processing techniques such that computational stages between the pre-filter and the image recognition algorithms can be shared.

It is therefore beneficial to briefly describe the Viola-Jones algorithm in order that its processing techniques can be understood. A strength of the Viola-Jones algorithm is that it works with an integrated image. Once the integrated image has been formed then pixel averages over arbitrary portions of the image can be rapidly calculated by a few arithmetic operations.

Figure 1:
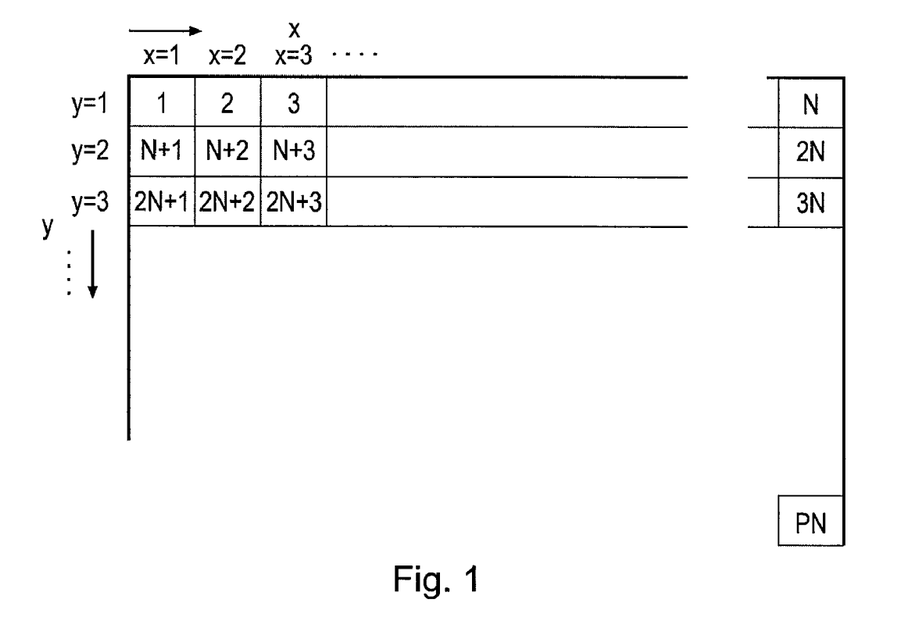
FIG. 1 represents pixel positions within an image.

FIG. 1 schematically illustrates pixel positions within a digital image. The image has an extent in the X direction, which corresponds to the horizontal direction in FIG. 1, and the Y direction which corresponds to the vertical direction in FIG. 1. The image is N pixels wide and P pixels deep. Therefore each pixel within the image could be described either by an X and Y co-ordinate, or by a pixel number. Both schemes will be used herein and are related such that, as shown in FIG. 1, the first row of pixels can be designated 1 to N, the second row of pixels can be designated by pixel numbers N+1 to 2N, the third row of pixels can be designated by pixel numbers 2N+1 to 3N and so on until we get to the final pixel in the bottom right hand corner of the image which is pixel number PN. Using this pixel identification scheme it then becomes clear that an integrated image can be formed by taking the current grey scale value of a pixel and adding to it the grey scale values of all the preceding pixels, in accordance with a summing sequence.

Various summing sequences are possible. For example one could simply sum across the rows in a "raster" scan like sequence. However, given that the Viola-Jones image recognition algorithm works with rectangle features, it is appropriate to use an integral image forming algorithm that is sympathetic to being used to calculate average values of rectangles.

If we return to the x, y notation of FIG. 1, then the integral image at location x, y, contains the sum of pixel values above and the left of x, y, inclusive.

$$ii(x, y) = \sum_{x' \leq x, y' \leq y} i(x', y')$$

where
  ii(x, y) is the integral image, and
  i(x, y) is the original image

In fact, the original Viola-Jones paper gives a pair of recurrences
  S(x, y)=S(x, y−1)+i(x, y)
  ii(x, y)=ii(x−1, y)+S(x, y)
where S(x,y) is a cumulative row sum, S(x,−1)=0, and ii(−1, y)=0. Using these relations an integral image can be completed in a single pass over the original image.

Figure 2:
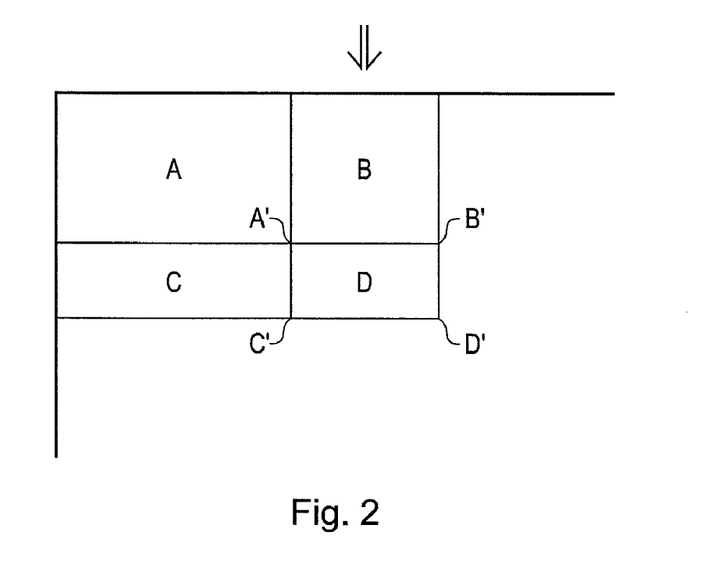
FIG. 2 shows an example of the formation of an integral value for an area D from the an integral image.

Having done this, the sum of pixel values within a given rectangle, for example the rectangle D in FIG. 2 can be calculated rapidly. The value of the integral image at location A' is the sum of pixels in rectangle A. The value at location B' is the sum A+B, the value at location C' is A+C and the sum at location D' is A+B+C+D.

Consequently the sum within D can be calculated as $$D=D'+A'-(B'+C')$$

However, other summing algorithms could be used, such as merely summing along each row or column and looking at differences in values where the row or column intersects a mask shape. Alternatively a choice could be made to calculate an image value within each are of the mask/test area.

The Viola-Jones method then scans a "detection window" across the image. The detection window was described by Viola and Jones to be a 24×24 pixel sub image (within a 384×288 image) that had rectangle features (which can be considered as masks) disposed within each detection window. Once a scan using the detection window is completed the window and/or image is rescaled and the process is repeated. This continues until the image has been scanned at all the resolutions dictated by the system designer.

Figure 3:
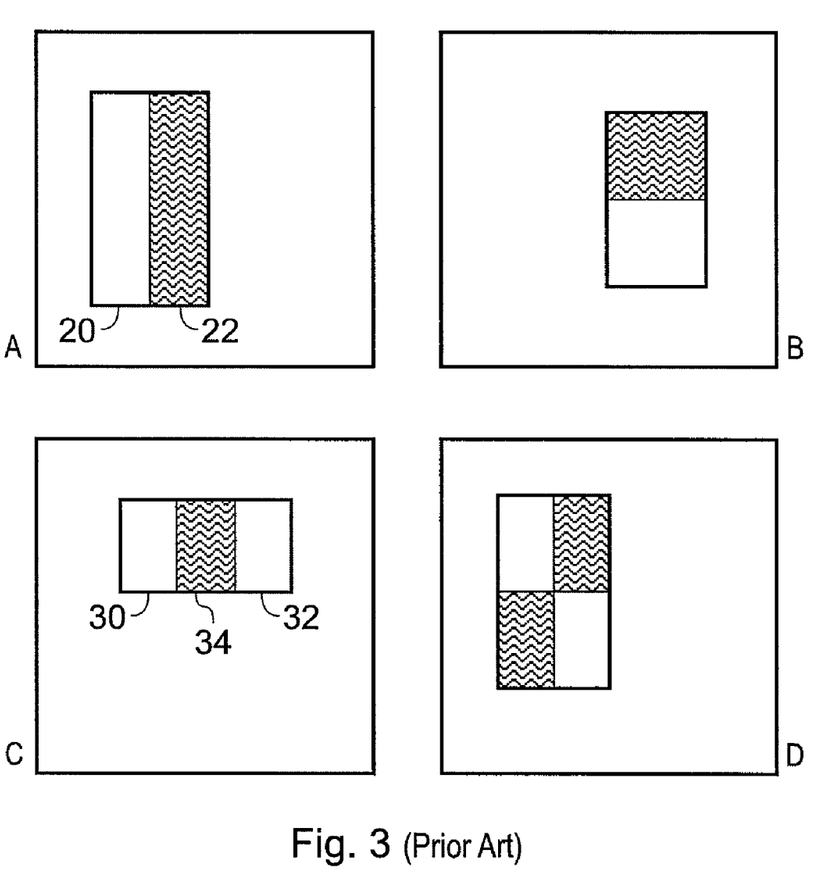
FIGS. 3a to 3d show masks used in a Viola-Jones face detection algorithm.

Example feature rectangles are shown in FIGS. 3a to 3d. In each case an average grey scale value is calculated for each rectangle. Then in FIG. 3a a difference is formed between the value for rectangle 20 and that of rectangle 22. The same processing occurs for the area shown in FIG. 3b. In FIG. 3c there are two white areas 30 and 32 and only one black area 34, consequently intensity value for the areas 30 and 32 are summed and then twice the value of area 34 is subtracted from the sum. It can be seen intuitively that if the rectangle of FIG. 3c was applied to the population of all possible image patches, then the distribution of response of patches correctly aligned with a face so that one eye fell in area 30, the nose in area 34 and another eye in area 32 would be significantly different from the distribution of other patches. The differences indicates that this test pattern can provide some discrimination between a general population of image variations and those in a target group. Thus each feature rectangle looks for a specific pattern that is indicative that a face might be present—but has a reasonable chance of correctly indicating when a face is not present.

Each of these image classifiers is relatively "weak" in that they do not give a strong indication of the presence of a face in an image. However they are quick to calculate and have a low false negative rate (i.e. incorrectly rejecting images that do contain a face). It is known that such features may be combined to form 'image classifiers' that give high reliability.

It might be thought that it would be beneficial to modify the Viola-Jones algorithm to improve the strength of some of the classifiers. However the algorithm executes very efficiently and most attempts to put additional decision steps in to improve it result in it running more slowly.

As noted herein, the Viola-Jones algorithm only provides detection for a single view orientation.

It is estimated to require to between 36 and 60 separate instantiations of the Viola-Jones algorithm to locate faces within an image at any arbitrary angle. Processing and search time scales proportionately to the number of instantiations used.

The present invention provides a pre-filter which is quick to execute and which enables decision to be made about running a reduced set of recognition algorithms.

Figure 4:
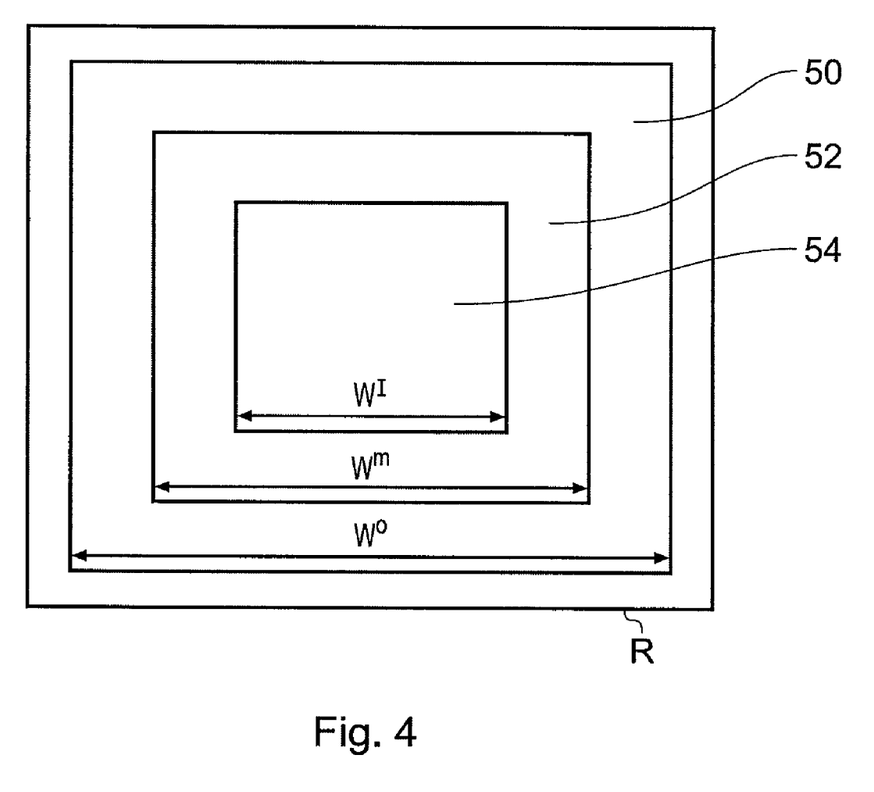
FIG. 4 schematically shows a spatial filter constituting an embodiment of the present invention.

The pre-filter subdivides a search area, i.e. a portion of the image, into a plurality of regions. These test regions define a spatial filter. A plurality of such test regions are schematically illustrated in FIG. 4. Within each test region the individual pixels therein are analysed and are used to calculate a metric for the test region. The metric may be based on a number of functions, such as mean value, variance or other moments of the pixel values within the test region.

In the example shown in FIG. 4 the individual test regions 50, 52 and 54 comprise three concentric rectangles. The rectangles are concentric in this example, but some instantiations of the pre-filter might not require concentricity and it is expected that specific images being searched for might benefit from lack of concentricity. The test pattern defined by the test regions exhibits rotational symmetry in the plane of the page by 90°; and also exhibits two fold reflection symmetry. The pre-filter can intuitively be seen to match reasonably well when a face is inclined (say at 45°) to the sides of the pre-filter image, or when a face is aligned with any of the sides of the rectangle.

The pre-filter comprises a plurality, in this case 3, rectangles. The outer rectangle has a width $W^O$. The middle rectangle 52 has a width $W^M$, and the inner rectangle has a width $W^I$.

A mean intensity is calculated for the test regions 50, 52 and 54. The region 50 designates the space bounded between the outer rectangle and middle rectangle. The region 52 designates the space bounded between the middle rectangle and the inner rectangle, whereas the inner region 54 is the space bounded by the edges of the inner rectangle.

In use, a metric of the image intensity within each of the regions is calculated. The metric may, for example, by average image intensity.

Once the metric has been calculated, it is passed to a parameterisation routine where for a region R of the image under investigation a function D is calculated.

$$D(R, W^O, W^M, W^I)$$

If we let j be an index, then we can form a pre-filter function, where j is a counter for different sizes of rectangles.

$$F(R) = \left( \sum_{j=0}^{j=J} I[D(R, W_j^O, W_j^M, W_j^I) > \tau_j] \alpha_j^+ + I[D(R, W_j^O, W_j^M, W_j^I) \le \tau_j] \alpha_j^- \right) \theta$$

where
  θ is a threshold value
  τ is a threshold value
  I[ ] is an indicator function
  $\alpha^+$ and $\alpha^-$ are scaling constants $$D(R, W_j^O, W_j^M, W_j^I) = A(R, W_j^O) - 2A(R, W_j^M) + A(R, W_j^I)$$

and A(R, W) is the average intensity of a square having side W having its centre at the centre of an image path R.

Thus the pre-filter gives a single output value, a filter value, for its evaluation of the characteristics of the region R within a target image that is to be evaluated.

Whilst the above describes the computations for a single pre-filter, it should be noted that by pre-computing the intensity for a multiplicity (greater than three) of concentric rectangles then multiple pre-filter functions can be calculated by selecting combinations of the pre-computed intensities from the pre-computed set of intensities. This enables a single pre-computation operation to be reused many times for different pre-filter functions. Thus, in an example embodiment of the invention a relatively modest number, say 10, rectangles may be pre-computed, and are used in different combinations for the sixty or so views according to which combination of the pre-computed rectangles (which may be squares) is suited to the particular pre-filter task.

In alternative embodiments of the invention other functions of the intensity within each rectangle/square may be used. Furthermore, as before, the scaling of the squares may be selected such that a test at one scale i.e. square size can use values calculated at a preceding test. This reduces the computational cost.

The pre-filter is not limited to working solely with average image intensities—although these are clearly easy to calculate. The pre-filter could instead look at intensity variance or other parameters of pixel variation within a region of the image.

The Viola-Jones feature masks exhibit only 180° (2 fold) rotational symmetry. The mask provided by the concentric rectangles of FIG. 4 can exhibit higher symmetry when the rectangles are squares (90° or 4 fold rotational symmetry) making it more amenable to locating objects in other than upright orientations.

Test shapes having higher orders of rotational symmetry or of different shapes could be used. We can see that in the limiting case the test shapes would become concentric circles and that such a test pattern centred on the bridge of a person's nose would be insensitive to the orientation of the person's face within an image as long as the face was looking directly at the view point (camera).

Figure 7:
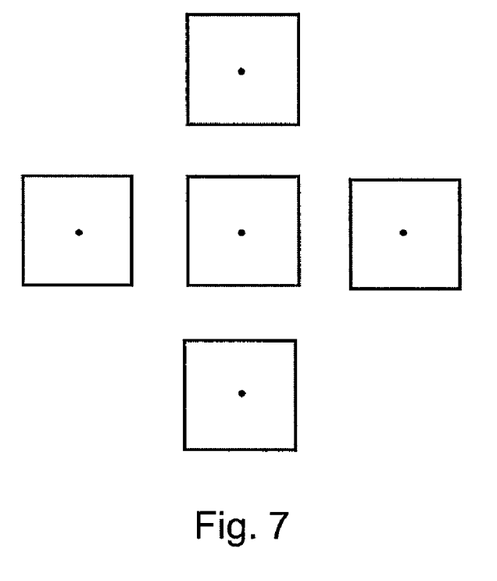
FIG. 7 schematically illustrates a filter constituting a second embodiment of the present invention.
Figure 8:
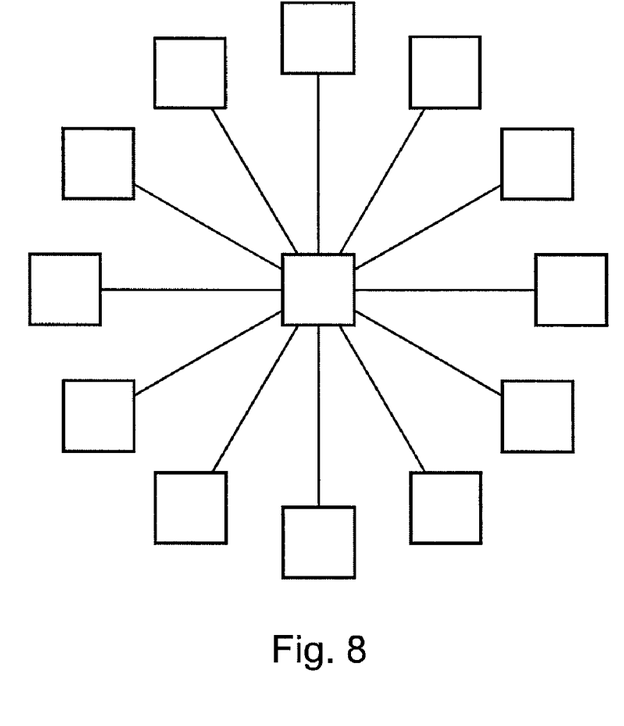
FIG. 8 schematically illustrates a filter constituting a third embodiment of the present invention.

Other pre-filter functions are also possible. FIGS. 7 and 8 show examples of other filter shapes. The arrangement shown in FIG. 7 can be orientated as a "+" or a "x" or an arbitrary value in between. The arrangement of FIG. 8 has 12 outer squares arranged in a circular fashion around a central square.

As with the arrangement shown in FIG. 4, these test masks can be rescaled with respect to the region of the image under investigation so as to check for different sizes/levels of zoom of a feature within the image.

The pre-filter may itself have a plurality of pre-filter functions which operate over the test region R, the pre-filter functions can be designated $P_1$, $P_2$ and so on, for example using the other masks of FIGS. 7 and 8.

Each pre-filter can be tested against a specific one of the image recognition instantiations. Where the image recognitions instantiations are adapted to identify faces at various orientations within a frame of reference, then each image recognition algorithm/instantiation may be designated by an index so that we have face detection algorithms $F_1$, $F_2$, $F_3$ and so on.

The pre-filter may include a correlation matrix to identify correlations between a particular pre-filter function and those face recognition functions which should be tested based on the results from specific pre-filters. An exemplary correlation table is shown in FIG. 5.

Figure 5:
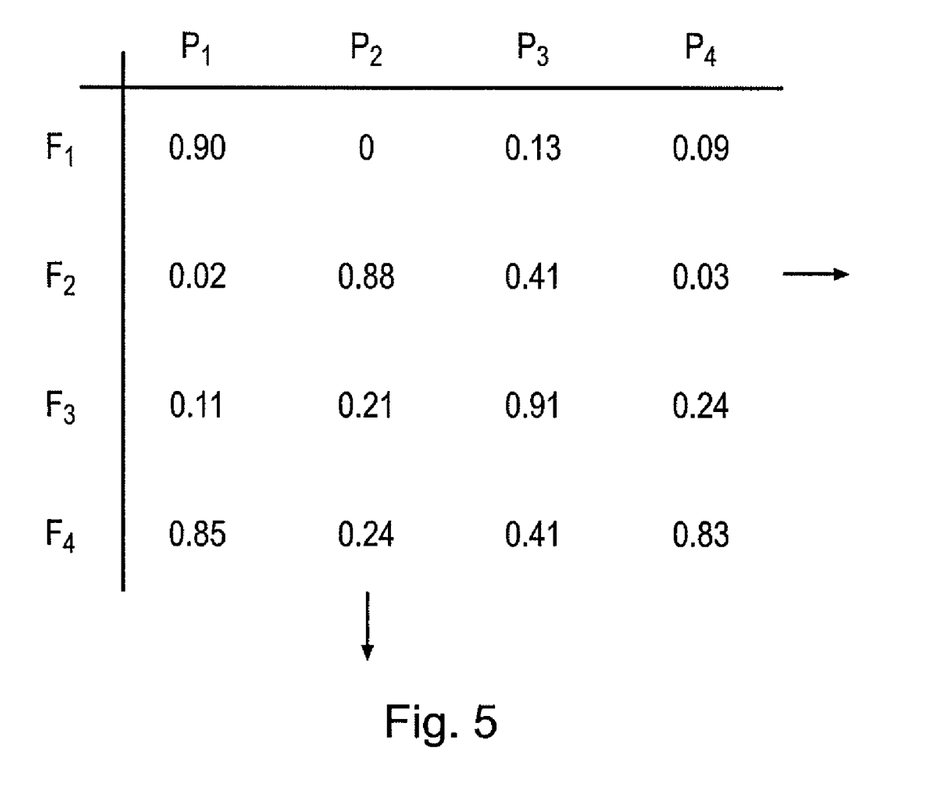
FIG. 5 shows a correlation array correlating pre-filter masks against subsequent detection processes.

For any one of the pre-filters $P_1$, $P_2$ and so on the table is FIG. 5 provides a likelihood that one of the face recognition algorithms, which are subsequent processes, will identify a face within the image (or a portion thereof) under investigation. Those with a low or zero likelihood can be omitted, thereby increasing computational speed by reducing the overall size of the task.

Suppose $P_1$ is a pre-filter for looking for a face which is vertical in an image and looking directly at a camera, then we might expect that pre-filter to be strongly correlated with a face recognition algorithm $F_1$ that also looks for a vertical face looking towards the camera, and also with algorithm $F_4$ which, in this example, looks for an inverted face looking directly towards the camera.

Thus, after having applied pre-filter $P_1$, if pre-filter $P_1$ comes up with pre-filter value in excess of the threshold θ (thereby indicating that pre-filter $P_1$ thinks it found a face) then face detection algorithms $F_1$ and $F_4$ would be run, but face detection algorithms $F_2$ and $F_3$ which have a low degree of correlation which would not ordinarily be run.

The matrix values in FIG. 5 could be truncated to 1 or 0 to keep the matrix simple, but use of intermediate values allows a user to adjust the sensitivity of the face detection system by specifying a threshold value for the correlation coefficient with face detection algorithms $F_N$ having a correlation coefficient above the threshold value being tested.

The table of FIG. 5 could be implemented using only one pre-filter as it would still enable decisions to be taken not to run some (or indeed any) of the subsequent face detection algorithms.

The pre-filter technique disclosed herein does not impose a significant computational burden because it can form the average values within the detection window and the search masks therein by using the integral image that will be used by the Viola-Jones algorithm.

The pre-filter can give a rapid indication of whether the image is unlikely to contain a face, in which case none of the Viola-Jones algorithms need be run.

The algorithm can be run within quite modest computational resources, such as a camera or a printer.

Figure 6:
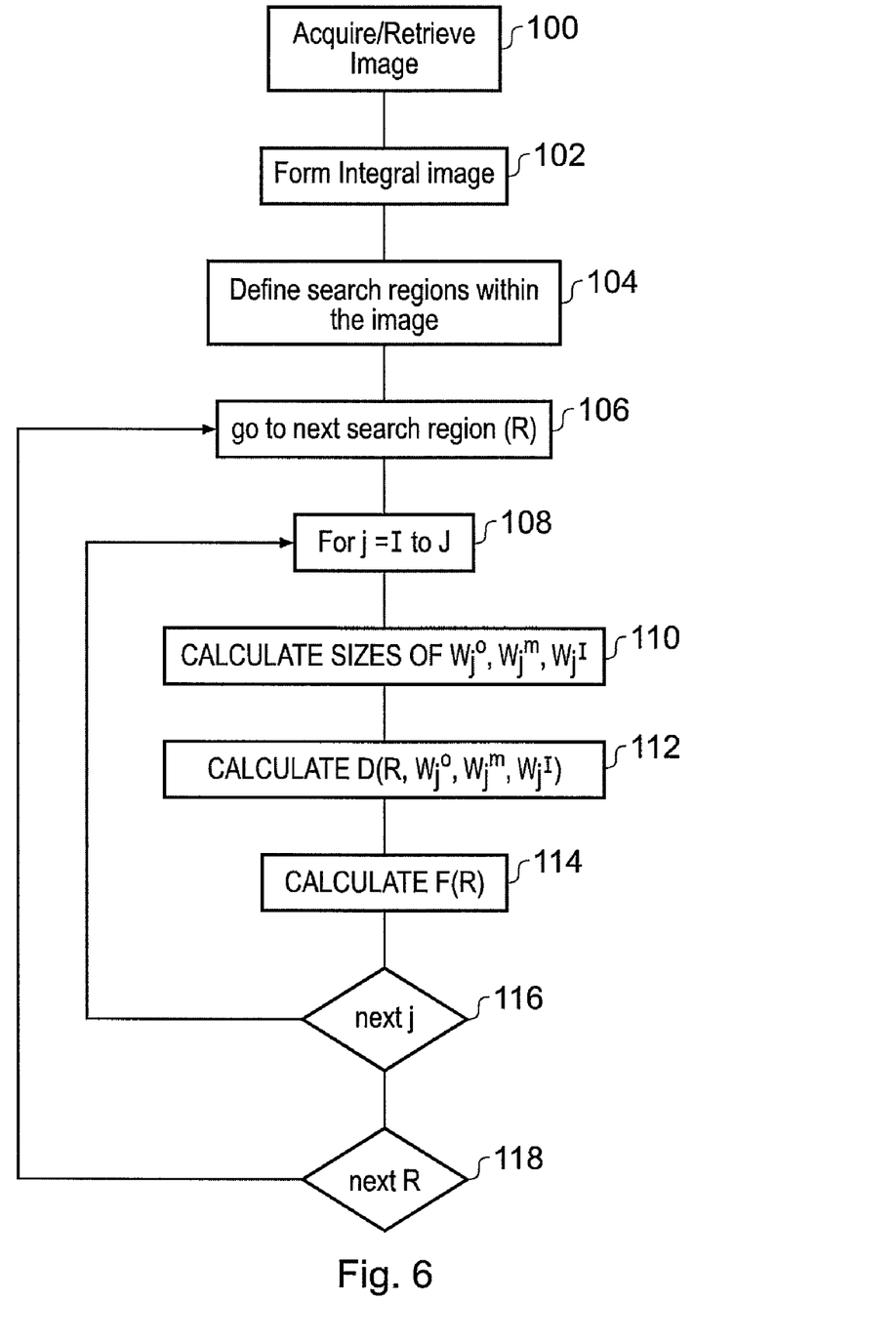
FIG. 6 is a flow chart exemplifying the steps in a computer implementation of the present invention.

A flow chart for implementing within a data processing system is shown in FIG. 6. The process starts at step 100 where an image to be processed is acquired, for example from an optical sensor or a memory. From step 100 control passes to step 102 where a data processor of the data processing system 102 forms an integral image, using techniques known from the prior art. Next a search region R is defined at step 104, and a series of positions x=1 to R are determined such that the search square will be progressively scanned over the image under test. From step 104 the algorithm progresses to step 106 where a test is made to check for the existence of a next search position for the search square (that is the first position in this instance). From then a loop comprising steps 108, 110, 112, 114 and 116 is executed.

Within the search region a plurality of tests, J tests, are made with different sizes of squares 50, 52, 54 so as to account for different scales of images within a picture. This is done by picking different values of $W^o$, $W^m$ and $W^I$ for each one of the J tests. Then for a given value of $W^o$, $W^m$ and $W^I$ a value D is calculated at step 112 for the position of the search region R. The values D are then used with the indicator function to calculate a pre-filter value F(R) for search region R at step 114. A test is made at step 116 to see if other values of j are still be tested, and if so control loops round to step 108, otherwise control passes to step 118, which itself forms a loop with step 106.

In a preferred implementation the flow chart of FIG. 6 is modified by the inclusion of a step interposed between steps 106 and 108 of calculating K metrics (i.e. K intensity values for K squares, where K<J) such that the J tests can select different combinations of $W^o$, $W^m$ and $W^I$ from the pre-computed values. This step 110 is modified to read the appropriate values for the jth test from the pre-calculated values The values provided by the pre-filter algorithm provide an indication of whether one or several of the face detection algorithms should then be run or excluded, giving a computational saving by excluding those face detection algorithms that need not be run.

Figure 9:
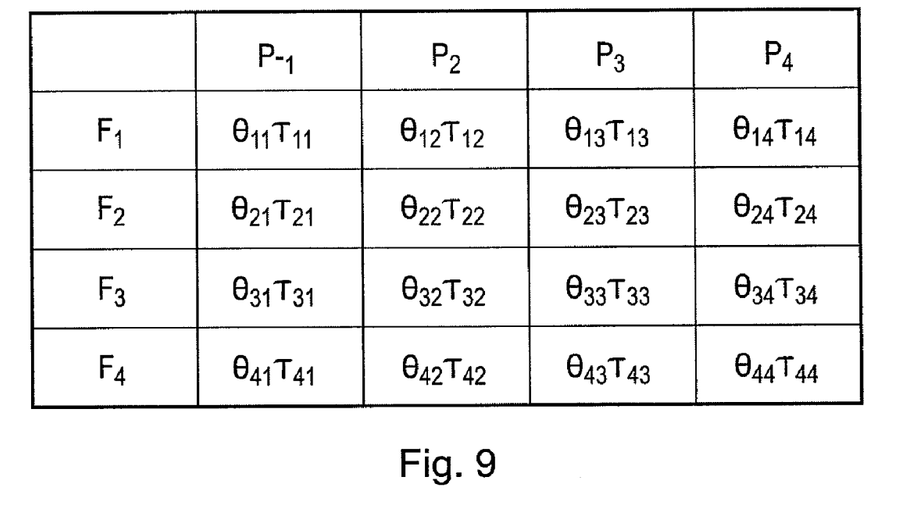
FIG. 9 shows a table of thresholds for selecting which face or image detection algorithms can be excluded.

The correlation matrix of FIG. 5 could further be modified as shown in FIG. 9 to apply individual lower, $\theta_{ij}$, and upper $\tau_{ij}$ thresholds to each pre-filter and face detection algorithm pair (i, j) to decide whether a face detection algorithm can be excluded from execution, and hence to decrease the processing time required to examine an image. Thus the calculation of the pre-filter value may use differing threshold values depending on the combination of regions selected.

Although the invention has been described in the context of face detection algorithms (because these are relatively common and are used to change settings in printers and cameras so as to improve the representation of skin tones) masks may be used in conjunction with other image recognition algorithms

The invention claimed is:

1. A method, comprising the steps of:
    applying, by the processor, a spatial filter to a portion of an image, the spatial filter comprising a plurality of test regions;
    calculating, by the processor, for each of the test regions within the portion of the image a metric as a function of intensity within the test region;
    determining, by the processor, for the portion of the image a filter value based on the metrics of each of the test regions; and
    comparing, by the processor, the filter value with a threshold to identify a subsequent process that can be skipped.

2. The method of claim 1, the spatial filter comprising at least first and second overlapping test regions, the second test region enclosed by the first test region.

3. The method of claim 2, the spatial filter comprising a third test region, the third region enclosed by the second region.

4. The method of claim 2, wherein the overlapping test regions are concentric.

5. The method of claim 1, the spatial filter comprising a centrally disposed first test region and at least four other test regions disposed symmetrically around the central region.

6. The method of claim 5, the at least four other test regions are equidistant from the first region.

7. The method of claim 6, each of the other test regions is rectangular and the centres of the rectangles are equally displaced from the centre of the first test region.

8. The method of claim 1, comprising varying, by the processor, the sizes of one or more of the test regions within the spatial filter during the determination of the filter value.

9. The method of claim 1, comprising applying, by the processor, the spatial filter to a plurality of portions of the image.

10. The method claim 3, the first test region comprising a first square having a width of $W^o$, the second test region comprising a second square having a width of $W^m$, and the third test region comprising a third square having a width of $W^I$, and the method comprising:
    calculating an average intensity value for the area enclosed by each square.

11. The method of claim 1, the spatial filter comprising three test regions, a first square, a second square and a third square, and the method comprising:
    calculating, by the processor, a first average intensity value for the area bounded between the first and second squares,
    calculating, by the processor, a second average intensity value for the area bounded between the second and third squares; and
    calculating, by the processor, a third average intensity value is calculated for the area bounded by the third square.

12. The method of claim 10, the average intensity values are identified as $A(W^o)$ for the first square, $A(W^m)$ for the second square and $A(W^I)$ for the third square, and the filter value for the area under investigation is calculated by:

$$D=A(W^o)-2A(W^m)+A(W^I).$$

13. The method of claim 1, comprising calculating, by the processor, a plurality of filter values for a plurality of different combinations of test regions for the portion of the image, each filter value for each combination is based on an average image intensity for each test region in the combination.

14. The method of claim 10, comprising calculating, by the processor, a plurality of filter values based on a plurality of average intensity values for a plurality of square sizes.

15. The method of claim 13, comprising determining, by the processor, for each of the calculated filter values when an associated threshold for each of one or more subsequent processes is exceeded.

16. The method of claim 15, comprising executing, by the processor, the subsequent processes corresponding with each of the calculated filter values exceeding the associated threshold.

17. The method of claim 1, the subsequent process comprising an orientation specific image recognition process.

18. The method of claim 1, the subsequent process comprising a face detection process.

19. The method of claim 14, executing, by the processor, subsequent processes when one or more of the filter values exceed an associated threshold.

20. The method of claim 1, comprising comparing, by the processor, one of average intensity of the image within a plurality portions of the spatial filter and a variance within or between the portions of the spatial filter.

21. A method as claimed in claim 1, the spatial filter exhibits at least four degrees of rotational symmetry.

22. A method as claimed in claim 1, comprising varying, by the processor, threshold values within the calculation of the filter values depending on a selected combination of test regions.

23. A system comprising:
a memory; and
a data processor to:
  apply a spatial filter to a portion of an image, the spatial filter comprising a plurality of test regions;
  calculate for each of the test regions within the portion of the image a metric as a function of intensity within the test region;
  determine for the portion of the image a filter value based on the metrics of each of the test regions; and
  compare, the filter value with a threshold to identify a subsequent process that can be skipped.

24. A computer program stored in a computer readable medium that, when executed, enable a data processor to:
  apply a spatial filter to a portion of an image, the spatial filter comprising a plurality of test regions;
  calculate for each of the test regions within the portion of the image a metric as a function of intensity within the test region;
  determine for the portion of the image a filter value based on the metrics of each of the test regions; and
  compare, the filter value with a threshold to identify a subsequent process that can be skipped.

* * * * *

UNITED STATES PATENT AND TRADEMARK OFFICE
CERTIFICATE OF CORRECTION

PATENT NO. : 8,300,973 B2
APPLICATION NO. : 11/953221
DATED : October 30, 2012
INVENTOR(S) : Darryl Greig It is certified that error appears in the above-identified patent and that said Letters Patent is hereby corrected as shown below:

In column 8, line 29, in Claim 10, delete "method" and insert -- method of --, therefor.

Signed and Sealed this
Nineteenth Day of March, 2013

Teresa Stanek Rea
*Acting Director of the United States Patent and Trademark Office*